United States Patent
Silvlin

(10) Patent No.: US 9,358,984 B2
(45) Date of Patent: Jun. 7, 2016

(54) DRIVER INTENTION ESTIMATION ARRANGEMENT

(71) Applicant: VOLVO CAR CORPORATION, Gothenburg (SE)

(72) Inventor: Jonatan Silvlin, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/644,367

(22) Filed: Mar. 11, 2015

(65) Prior Publication Data

US 2015/0266486 A1    Sep. 24, 2015

(30) Foreign Application Priority Data

Mar. 24, 2014    (EP) ..................... 14161256

(51) Int. Cl.
| | | |
|---|---|---|
| G06F 7/70 | (2006.01) | |
| B60W 40/09 | (2012.01) | |
| B60W 30/18 | (2012.01) | |
| B60W 40/08 | (2012.01) | |

(52) U.S. Cl.
CPC ......... *B60W 40/09* (2013.01); *B60W 30/18163* (2013.01); *B60W 40/08* (2013.01); *B60W 2540/00* (2013.01)

(58) Field of Classification Search
None
See application file for complete search history.

(56) References Cited

U.S. PATENT DOCUMENTS

| 8,543,310 | B2 | 9/2013 | Kashi et al. | |
|---|---|---|---|---|
| 2002/0020579 | A1* | 2/2002 | Yamamoto | B62D 11/183 180/446 |
| 2003/0158648 | A1* | 8/2003 | Kubota | B60W 30/16 701/96 |
| 2003/0195667 | A1 | 10/2003 | Tange et al. | |
| 2005/0273264 | A1 | 12/2005 | Gern et al. | |
| 2015/0232030 | A1* | 8/2015 | Bongwald | B60R 1/00 348/115 |

FOREIGN PATENT DOCUMENTS

| DE | 102005043838 | 3/2007 |
|---|---|---|
| DE | 102008046695 | 3/2010 |
| DE | 102010002067 | 8/2011 |
| EP | 1743818 | 1/2007 |
| EP | 1769969 | 4/2007 |
| EP | 2143611 | 1/2010 |
| EP | 2571004 | 3/2013 |

OTHER PUBLICATIONS

Extended European Search Report for European Application No. EP 14161256.4, Completed by the European Patent Office, Dated Sep. 16, 2014, 11 Pages.

* cited by examiner

*Primary Examiner* — Adam Alharbi
(74) *Attorney, Agent, or Firm* — Brooks Kushman P.C.

(57) ABSTRACT

A driver intention estimation arrangement is provided to estimate a level of overtaking intention of a driver of a vehicle hosting the arrangement. The arrangement includes a driver eye monitoring unit configured to monitor a gaze direction (g) of at least one eye of the driver, and a processing unit configured to analyze the gaze direction (g). The processing unit is configured to estimate the level of overtaking intention on the basis of the gaze direction (g). A forward collision warning system, an autonomous brake system, a vehicle, and a method of estimating a level of overtaking intention of a host vehicle driver are also provided.

12 Claims, 2 Drawing Sheets

DRIVER INTENTION ESTIMATION ARRANGEMENT

CROSS-REFERENCE TO RELATED APPLICATIONS

This application claims foreign priority benefits under 35 U.S.C. §119(a)-(d) to European Patent Application No. EP 14161256.4, filed March 24, 2014, which is incorporated by reference in its entirety.

TECHNICAL FIELD

The present disclosure relates to a driver intention estimation arrangement. The present disclosure also relates to a forward collision warning system, an autonomous brake system, a vehicle and a method of estimating a level of overtaking intention of a host vehicle driver.

BACKGROUND

In recent years, safety improving arrangements and systems have been developed in the automotive industry. Such safety improving arrangements and systems are for example airbags, seat belt tensioners, traction control systems, stability control systems, collision warning systems or collision mitigation systems. Some of such systems are capable of improving the safety of driving and some of such systems are capable of improving occupant safety during a vehicle collision. Systems capable of improving the safety of driving are also referred to as active safety systems, and systems capable of improving occupant safety during a collision are also referred to as passive safety systems. Both passive and active safety systems would benefit if they were provided with information about an intention of the host vehicle driver. For example, in a situation where a hosting vehicle is approaching a preceding vehicle with high relative velocity between the hosting vehicle and the preceding vehicle and where it appears only to be a matter of seconds before an impending collision between the two, it would be beneficial if information were available about whether the host vehicle driver intends to initiate an overtaking of the preceding vehicle or not. That is, if it could be determined whether the host vehicle driver intends to initiate an overtaking or not, the safety improving potential of passive and active safety systems would be improved. For example, in case it is determined that the host vehicle driver does not intend to overtake a preceding vehicle, and it is detected that the host vehicle is approaching a preceding vehicle with high relative velocity between the hosting vehicle and the preceding vehicle, and where it appears to be a matter of seconds before an impending collision between the two, a seat belt tensioner could be designed such that it tensions a seat belt before the impending collision, an air bag could be designed such that it is prepared for deployment before the impending collision, a collision warning system could be designed such that it warns the host vehicle driver about the impending collision, a collision mitigation system could be designed such that it mitigates the collision for example by a braking of the host vehicle before the impending collision. Accordingly, as reasoned above, it would be beneficial for many arrangements and systems in modern vehicles, if one could determine if the host vehicle driver intends to overtake a preceding vehicle or not.

Attempts have been made to provide methods for determining a level of overtaking intention of a host vehicle driver. For example, the document U.S. Pat. No. 8,543,310 B2 relates to a method for operating an automatic speed control system of an automotive vehicle. In the document, it is described that the driver's intention to overtake can be determined based upon some parameters, such as the activation of a vehicle turn signal, and a steering angle. However, such method fails to estimate the driver's intention to overtake in a satisfactorily manner.

Therefore, in view of the above, there is a need for methods and arrangements providing an improved estimation of a level of overtaking intention of a vehicle driver.

SUMMARY

An object of some embodiment of the present disclosure is to provide an arrangement with an improved capability to estimate a level of overtaking intention of a driver of a vehicle hosting the arrangement.

According to an exemplary aspect of the disclosure, the object is achieved by a driver intention estimation arrangement configured to estimate a level of overtaking intention of a driver of a vehicle hosting the arrangement, the arrangement comprising a driver eye monitoring unit configured to monitor a gaze direction of at least one eye of the driver, and a processing unit configured to analyze the gaze direction, where the processing unit is further configured to estimate the level of overtaking intention on the basis of the gaze direction.

Since the level of overtaking intention is estimated on the basis of the gaze direction, an arrangement is provided with an improved capability to estimate a level of overtaking intention of a driver of a vehicle hosting the arrangement.

As a result, the above mentioned object is achieved.

Further, since the level of overtaking intention is estimated on the basis of the gaze direction, an arrangement is provided capable of estimating a level of overtaking intention of a driver of a vehicle in a simple and reliable manner.

According to some embodiments, the analysis of the gaze direction involves a determination of whether the gaze direction of the at least one eye of the driver is towards a rear view mirror, and where the processing unit is further configured to estimate the level of overtaking intention on the basis of this determination. Since the processing unit is further configured to estimate the level of overtaking intention on the basis of whether the gaze direction of the at least one eye of the driver is towards a rear view mirror, the capability to estimate the level of overtaking intention of the driver is further improved.

According to some embodiments, the analysis of the gaze direction involves a determination of a time period during which the gaze direction of the at least one eye of the driver is in a direction towards a rear view mirror, and where the processing unit is further configured to estimate the level of overtaking intention on the basis of this time period. Since the processing unit is further configured to estimate the level of overtaking intention on the basis of this time period during which the gaze direction of the at least one eye of the driver is in a direction towards a rear view mirror, the capability to estimate the level of overtaking intention of the driver is further improved.

According to some embodiments, the analysis of the gaze direction involves a determination of whether the gaze direction of the at least one eye of the driver is towards a rear view mirror in more than one occasion during a predetermined time period, and where the processing unit is further configured to estimate the level of overtaking intention on the basis of this determination. Since the processing unit is further configured to estimate the level of overtaking intention on the basis of a determination of whether the gaze direction of the at least one eye of the driver is towards a rear view mirror in more than one occasion during a predetermined time period, the capability to estimate the level of overtaking intention of the driver is further improved.

According to some embodiments, the arrangement further comprises a pedal sensor, configured to sense positions of an accelerator pedal of the host vehicle, and where the processing unit is configured to analyze a pattern of accelerator pedal activity, and where the processing unit is further configured estimate the level of overtaking intention on the basis of the pattern of accelerator pedal activity. Since the processing unit is further configured estimate the level of overtaking intention on the basis of the pattern of accelerator pedal activity, the capability to estimate the level of overtaking intention of the driver is further improved.

According to some embodiments, the arrangement further comprises a distance sensor, configured to measure a distance to a preceding vehicle, and where the processing unit is further configured to estimate the level of overtaking intention on the basis of at least one of the measured distance to a preceding vehicle and a rate of change of the measured distance to a preceding vehicle. Since the processing unit is further configured to estimate the level of overtaking intention on the basis of at least one of the measured distance to a preceding vehicle and a rate of change of the measured distance to a preceding vehicle, the capability to estimate the level of overtaking intention of the driver is further improved.

According to some embodiments, the arrangement further comprises a lane position sensor, configured to measure a lateral position of the host vehicle in a current vehicle lane, and where the processing unit is further configured to estimate the level of overtaking intention on the basis of at least one of the measured lateral position of the host vehicle in the current vehicle lane and a rate of change of the measured lateral position of the host vehicle in the current vehicle lane. Since the processing unit is further configured to estimate the level of overtaking intention on the basis of at least one of the measured lateral position of the host vehicle in the current vehicle lane, and a rate of change of the measured lateral position of the host vehicle in the current vehicle lane, the capability to estimate the level of overtaking intention of the driver is further improved.

Further embodiments herein aim to provide a forward collision warning system comprising an arrangement according to some embodiments, where the system is configured to delay issuance of a warning in case the estimated level of overtaking intention is above a predetermined threshold level. Since the forward collision warning system comprises a driver intention estimation arrangement according to some embodiments, a system is provided with an improved capability to estimate a level of overtaking intention of a driver of a vehicle hosting the arrangement.

Again, as a result, the above mentioned object is achieved.

Also, since the system is configured to delay issuance of a warning in case the estimated level of overtaking intention is above a predetermined threshold level, an improved forward collision system is provided since the system will not distract the host vehicle driver in as many driving situations as it otherwise would. Also, due to the system being configured to delay issuance of a warning in case the estimated level of overtaking intention is above a predetermined threshold level, such a system can be designed such that issuance of a warning is advanced in case a level of overtaking intention of a driver is below a predetermined level. Thereby, overall occupant safety can be improved.

Further embodiments herein aim to provide an autonomous brake system comprising an arrangement according to some embodiments, where the system is configured to delay initiation of braking in case the estimated level of overtaking intention is above a predetermined threshold level. Since the autonomous brake system comprises a driver intention estimation arrangement according to some embodiments, a system is provided with an improved capability to estimate a level of overtaking intention of a driver of a vehicle hosting the arrangement.

Again, as a result, the above mentioned object is achieved.

Also, since the system is configured to delay initiation of braking in case the estimated level of overtaking intention is above a predetermined threshold level, an improved autonomous brake system is provided since the system will not distract the host vehicle driver in as many driving situations as it otherwise would. Also, due to the system being configured to delay initiation of braking in case the estimated level of overtaking intention is above a predetermined threshold level, such a system can be designed such that a braking point is advanced in case a level of overtaking intention of a driver is below a predetermined level. Thereby, overall occupant safety can be improved.

Further embodiments herein aim to provide a vehicle comprising an arrangement according to some embodiments hereof. Since the vehicle comprises a driver intention estimation arrangement according to some embodiments, a vehicle is provided with an improved capability to estimate a level of overtaking intention of a driver of a vehicle hosting the arrangement.

Again, as a result, the above mentioned object is achieved.

Further embodiments herein aim to provide a method of estimating a level of overtaking intention of a host vehicle driver, using an arrangement comprising a driver eye monitoring unit and a processing unit, the method comprising;
  monitoring a gaze direction of the at least one eye of the driver of the host vehicle using the driver eye monitoring unit,
  analyzing the gaze direction, and
  estimating the level of overtaking intention on the basis of the gaze direction, using the processing unit.

Since the level of overtaking intention is estimated on the basis of the gaze direction, a method is provided with an improved capability in the estimation of a level of overtaking intention of a host vehicle driver.

Again, as a result, the above mentioned object is achieved.

According to some embodiments, the step of analyzing the gaze direction involves;
  determining whether the gaze direction of the at least one eye of the driver is towards a rear view mirror, using the processing unit, and where the method further comprises;
  estimating the level of overtaking intention on the basis of this determination, using the processing unit.

Since the method comprises determining whether the gaze direction of the at least one eye of the driver is towards a rear view mirror, and the level of overtaking intention is estimated on the basis of this determination, a method is provided where the capability to estimate the level of overtaking intention of the driver is further improved.

According to some embodiments, the step of analyzing the gaze direction involves;
  determining a time period during which the gaze direction of the at least one eye of the driver is towards a rear view mirror, using the processing unit, and where the method further comprises;
  estimating the level of overtaking intention on the basis of this time period, using the processing unit.

Since the method comprises determining a time period during which the gaze direction of the at least one eye of the driver is towards a rear view mirror, and the level of overtaking intention is estimated on the basis of this time period, a method is provided where the capability to estimate the level of overtaking intention of the driver is further improved.

According to some embodiments, the arrangement further comprises a pedal sensor, configured to sense positions of an accelerator pedal of the host vehicle, where the method further comprises;

sensing positions of the accelerator pedal of the host vehicle, using the pedal sensor, analyzing a pattern of accelerator pedal activity, and estimating the level of overtaking intention on the basis of the pattern of accelerator pedal activity, using the processing unit.

Since the level of overtaking intention is estimated on the basis of the pattern of accelerator pedal activity, a method is provided where the capability to estimate the level of overtaking intention of the driver is further improved.

According to some embodiments, the arrangement further comprises a distance sensor, configured to measure a distance to a preceding vehicle, where the method further comprises;

measuring a distance to a preceding vehicle, using the distance sensor, and estimating the level of overtaking intention on the basis of at least one of the measured distance to a preceding vehicle and a rate of change of the measured distance to a preceding vehicle.

Since the level of overtaking intention is estimated on the basis of at least one of the measured distances to a preceding vehicle and a rate of change of the measured distance to a preceding vehicle, a method is provided where the capability to estimate the level of overtaking intention of the driver is further improved.

Further features of, and advantages with, the present disclosure will become apparent when studying the appended claims and the following detailed description. Those skilled in the art will realize that the different features described may be combined to create embodiments other than those described in the following, without departing from the scope of the present disclosure, as defined by the appended claims.

BRIEF DESCRIPTION OF THE DRAWINGS

Various aspects of the disclosure, including its particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and embodiments may take various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Embodiments herein will now be described more fully with reference to the accompanying drawings, in which example embodiments are shown. Disclosed features of example embodiments may be combined as readily understood by one of ordinary skill in the art. Like numbers refer to like elements throughout. Well-known functions or constructions will not necessarily be described in detail for brevity and/or clarity.

Figure 1:
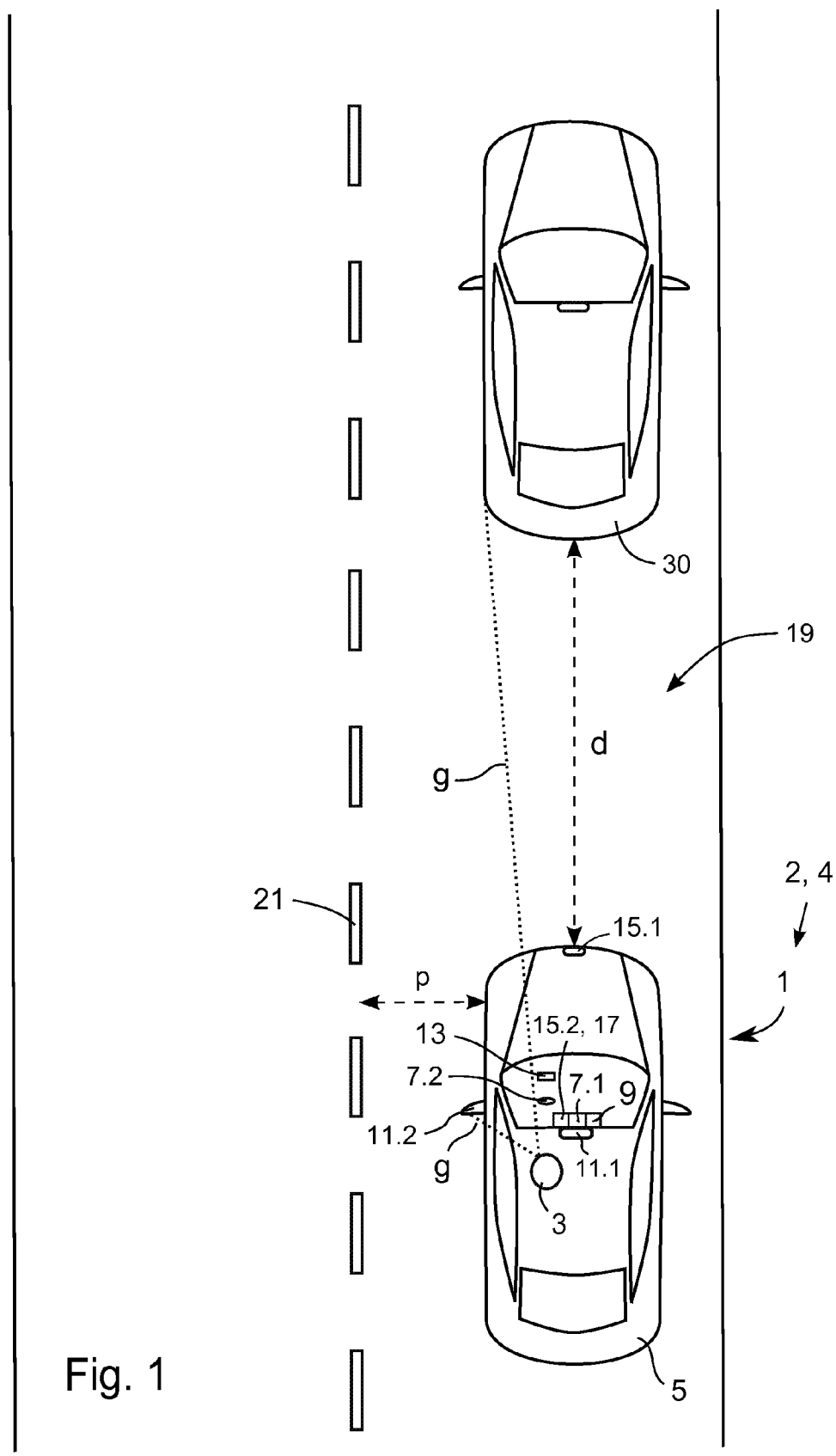
FIG. 1 illustrates a driver intention estimation arrangement 1.

FIG. 1 illustrates a driver intention estimation arrangement 1 configured to estimate a level of overtaking intention of a driver 3 of a vehicle 5 hosting the arrangement 1. The arrangement 1 comprises a driver eye monitoring unit 7.1, 7.2 configured to monitor a gaze direction g of at least one eye of the driver 3, and a processing unit 9 configured to analyze the gaze direction g. The processing unit 9 is configured to estimate the level of overtaking intention on the basis of the gaze direction g. Thereby, an arrangement 1 is provided with an improved capability to estimate a level of overtaking intention of a driver 3 of a vehicle 5 hosting the arrangement 1. Below, the vehicle 5 hosting the arrangement 1 is denoted host vehicle 5.

The analysis of the gaze direction g may involve analysis of a sequence of subsequent gaze directions with respect to gaze directions and gaze direction durations.

The driver eye monitoring unit 7.1, 7.2 may comprise an imaging unit such as a camera. Such an imaging unit may be capable of capturing images of the at least one eye of the driver 3 of the host vehicle 5, i.e. one or both of the eyes of the driver 3. Such an imaging unit may further be arranged to capture images of the at least one eye of the vehicle driver 3 in a wavelength in near infra-red spectrum, or in the infra-red spectrum. Such an imaging unit may further comprise one or more light emitting units arranged to emit light, having a wavelength in the near infra-red spectrum, or the infra-red spectrum, towards the at least one eye of the driver 3. Thereby, the driver eye monitoring unit 7.1, 7.2 may be able to monitor the gaze direction g of the at least one eye of the driver 3 even in dark conditions such as during night-time driving. The arrangement 1 may comprise two or more driver eye monitoring units.

As illustrated in FIG. 1, the driver eye monitoring unit 7.1, 7.2 may be arranged in a region of a rear view mirror, such as the illustrated driver eye monitoring unit 7.1, and/or in a region of an instrument panel, such as the illustrated driver eye monitoring unit 7.2. As an alternative, or in combination, the driver eye monitoring unit 7.1, 7.2, or units, may be arranged on a dashboard of the vehicle 5 or at a steering wheel of the vehicle 5.

The processing unit 9 may comprise one or more processors configured to analyze the gaze direction g, and to estimate the level of overtaking intention on the basis of the gaze direction g. The processing unit 9 may further comprise one or more memory units connected to the one or more processors. The analysis of the gaze direction g may involve the processing unit comparing images captured by the driver eye monitoring unit 7.1, 7.2 with images stored on one or more of such memory units.

The processing unit 9 may determine an overtaking intention value on the basis of the gaze direction g, where such overtaking intention value corresponds to the estimate of the level of overtaking intention. The processing unit 9 may be arranged to determine the overtaking intention value to a high value in case the gaze direction g indicates a high level of overtaking intention of the driver 3 hosting the arrangement 1 and to determine the overtaking intention value to a low value in case the gaze direction g indicates a low level of overtaking intention.

One or more host vehicle systems and arrangements may be arranged to utilize such an overtaking intention value. Such host vehicle systems and arrangement may be for example an airbag system, a seat belt tensioner system, a traction control system, a stability control system, a collision warning system, a collision mitigation system, a forward collision warning system, an autonomous brake system or a driver assisting system.

The analysis of the gaze direction may involve a determination of whether the gaze direction g of the at least one eye of the driver 3 is towards a rear view mirror 11.1, 11.2, and the processing unit 9 may further be configured to estimate the level of overtaking intention on the basis of this determination. As illustrated in FIG. 1, the rear view mirror may be a front rear view mirror 11.1 or a side rear view mirror 11.2 arranged at the same side of the vehicle 5 as the seat of the driver 3. The processing unit 9 may further be configured to estimate the level of overtaking intention to a higher level in case it is determined that the gaze direction g of the at least one eye of the driver 3 is towards the side rear view mirror 11.2 than in case it is determined that the gaze direction g of the at least one eye of the driver 3 is towards the front rear view mirror 11.1.

The analysis of the gaze direction g may involve a determination of a time period during which the gaze direction g of the at least one eye of the driver 3 is in a direction towards a rear view mirror 11.1, 11.2, and where the processing unit 9 further is configured to estimate the level of overtaking intention on the basis of this time period. The processing unit 9 may be configured to estimate the level of overtaking intention to a high level in case such time period exceeds 0.3 seconds.

The analysis of the gaze direction g may involve a determination of a fraction of a predetermined time period during which the gaze direction g of the at least one eye of the driver 3 is in a direction towards a rear view mirror 11.1, 11.2, and where the processing unit 9 further is configured to estimate the level of overtaking intention on the basis of this fraction. For example, the processing unit 9 may be configured to estimate the level of overtaking intention to a high level in case it is determined that the gaze direction g of the at least one eye of the driver 3 is in a direction towards a rear view mirror 11.1, 11.2 in at least 20 percent of the time of the last 3 seconds.

The analysis of the gaze direction may involve a determination of whether the gaze direction g of the at least one eye of the driver 3 is towards a rear view mirror 11.1, 11.2 in more than one occasion during a predetermined time period, and the processing unit 9 may be further configured to estimate the level of overtaking intention on the basis of this determination. For example, the processing unit 9 may be configured to estimate the level of overtaking intention to a high level in case it is determined that the gaze direction g of the at least one eye of the driver 3 is towards the side rear view mirror 11.2 on the driver's side of the vehicle 5 in more than one occasion during a time period of approximately 3 seconds. As an alternative, or in combination, the processing unit 9 may be configured to estimate the level of overtaking intention to a high level in case it is determined that the gaze direction g of the at least one eye of the driver 3 is towards the front rear view mirror 11.1, and then, within a predetermined time period, shifted towards the side rear view mirror 11.2 on the driver's side of the vehicle 5. Such predetermined time period may for example be 2 seconds.

The arrangement 1 may further comprise a pedal sensor 13, configured to sense positions of an accelerator pedal of the host vehicle 5, and the processing unit 9 may further be configured to analyze a pattern of accelerator pedal activity. In such embodiments, the processing unit 9 may further be configured estimate the level of overtaking intention on the basis of the pattern of accelerator pedal activity. That is, the processing unit 9 may be configured to raise a level of overtaking intention in case the pattern of accelerator pedal activity indicates a desired increase in power output from a driveline of the host vehicle 5.

The arrangement 1 may further comprise a distance sensor 15.1, 15.2, configured to measure a distance d to a preceding vehicle 30, and the processing unit 9 may further be configured to estimate the level of overtaking intention on the basis of at least one of the measured distance d to a preceding vehicle 30 and a rate of change of the measured distance d to a preceding vehicle 30. The distance sensor 15.1, 15.2 may comprise one or more sensors such as RADAR (RAdio Detection And Ranging) sensors or LASER (Light Amplification by Stimulated Emission of Radiation) sensors, or LIDAR (Light Detection And Ranging) sensors, or one or more imaging units, configured to measure a distance d to a preceding vehicle 30.

As illustrated in FIG. 1, such a distance sensor 15.1, 15.2, may be arranged in a frontal region of the host vehicle 5, such as the illustrated distance sensor 15.1, and/or in a region of the front rear view mirror 11.1, such as the illustrated distance sensor 15.2.

The processing unit 9 may be configured to raise a level of overtaking intention in case of a short measured distance, such as a distance shorter than one or more predetermined threshold distances. The processing unit 9 may also be configured to raise a level of overtaking intention in case of a rate of change of the measured distance is higher than a predetermined threshold rate of change.

The arrangement 1 may further comprise a lane position sensor 17, configured to measure a lateral position p of the host vehicle 5 in a current vehicle lane 19. In such embodiments, the processing unit 9 may further be configured to estimate the level of overtaking intention on the basis of at least one of the measured lateral position p of the host vehicle 5 in the current vehicle lane 19 and a rate of change of the measured lateral position p of the host vehicle 5 in the current vehicle lane 19.

The lane position sensor 17 may comprise an imaging unit configured to measure a lateral position p of the host vehicle 5 in a current vehicle lane 19. The lane position sensor 17 may be arranged in a region of the front rear view mirror 11.1 of the host vehicle 5. As an alternative, or in combination, the lane position sensor 17 may be arranged in a region of a side rear view mirror 11.2 of the host vehicle 5. As an alternative to, or in combination with, such an imaging unit, the lane position sensor 17 may comprise a space based satellite navigation system such as a Global Positioning System (GPS), The Russian GLObal NAvigation Satellite System (GLONASS), European Union Galileo positioning system, Chinese Compass navigation system, or Indian Regional Navigational Satellite System.

The processing unit 9 may be configured to raise a level of overtaking intention in case the measured lateral position p indicates that the lateral position of the host vehicle 1 is closer a centre line 21 of the road than a predetermined threshold distance. The centre line 21, referred to, may also be a lane marker of the current lane 19, which the vehicle 5 has to pass in order to properly overtake a preceding vehicle 30 travelling in the current lane 19. The processing unit 9 may also be configured to raise a level of overtaking intention in case a rate of change of the measured lateral position p of the host vehicle 5 in the current vehicle lane 19 exceeds a predetermined threshold value and is in a direction towards the lane marker of the current lane 19.

According to some embodiments, a driver assist system utilizes the estimation of the level of overtaking intention in the following way. In case the driver assist system recognizes a hazardous overtaking situation, and the estimation of the level of overtaking intention indicates a high level of overtaking intention, the driver assist system may be arranged to alert the driver and advise him to wait with the overtaking manoeuvre. In addition, such a driver assist system may be arranged to suggest a more suitable point for performing the overtaking manoeuvre further down the road in an intended direction of travel.

According to some embodiments, the processing unit 9 is configured to evaluate an input signal S1 representative of the gaze direction g together with one or more of the following input signals;

S2 representative of a pattern of accelerator pedal activity,

S3 representative of a measured distance d to a preceding vehicle 30,

S4 representative of a rate of change of the measured distance d to a preceding vehicle 30, S5 representative of a measured lateral position p of the host vehicle 5 in a current vehicle lane 19, and S6 representative of a rate of change of the measured lateral position p of the host vehicle 5 in a current vehicle lane 19, and on the basis of such an evaluation, estimate the level of overtaking intention.

Each of such an input signal S1-S6 may represent a value and such an evaluation may be performed by the processing unit 9 being configured to integrate a function for two or more signals S1-S6 described above, or to perform an addition of two or more signals S1-S6, to estimate the level of overtaking intention.

FIG. 1 also illustrates a forward collision warning system 2 comprising a driver intention estimation arrangement 1 according to some embodiments. The forward collision warning system 2 further comprises a distance sensor 15.1, 15.2 configured to measure a distance d to a preceding vehicle 30. The forward collision warning system 2 is configured to selectively issue a warning to the driver 3 of the host vehicle 5 on the basis of the measured distance d to a preceding vehicle 30 and of a rate of change of the measured distance d. In case the measured distance d to a preceding vehicle 30 and a rate of change of the measured distance d indicates an impending collision with the preceding vehicle 30, the forward collision warning system 2 is arranged to issue a warning to the driver 3. Further, the forward collision warning system 2 is configured to delay issuance of the warning in case the estimated level of overtaking intention is above a predetermined threshold level. That is, in case in case the measured distance d to a preceding vehicle 30 and a rate of change of the measured distance d indicates that the host vehicle 5 rapidly is approaching the preceding vehicle 30, the forward collision warning system 2 will issue the warning later in case the estimated level of overtaking intention is above a predetermined threshold level than in case the estimated level of overtaking intention is below the predetermined threshold level. Thereby, an improved forward collision warning system 2 is provided since the system 2 will not distract the host vehicle driver 3 in as many driving situations as it otherwise would.

Also, due to the system 2 being configured to delay issuance of a warning in case the estimated level of overtaking intention is above a predetermined threshold level, such a system 2 can be designed such that issuance of a warning is advanced in case a level of overtaking intention of a driver is below a predetermined level. Thereby, overall occupant safety can be improved.

FIG. 1 also illustrates an autonomous brake system 4 comprising a driver intention estimation arrangement 1 according to some embodiments. The autonomous brake system 4 further comprises a distance sensor 15.1, 15.2 configured to measure a distance d to a preceding vehicle 30. The autonomous brake system 4 is configured to selectively initiate braking of the host vehicle 5 on the basis of the measured distance d to a preceding vehicle 30 and a rate of change of the measured distance d. Thus, in case the measured distance d to a preceding vehicle 30 and a rate of change of the measured distance d indicates an impending collision with the preceding vehicle 30, the autonomous brake system 4 will initiate braking of the host vehicle 5. Further, the autonomous brake system 4 is configured to delay initiation of braking in case the estimated level of overtaking intention is above a predetermined threshold level. That is, in case in case the measured distance d to a preceding vehicle 30 and a rate of change of the measured distance d indicates that the host vehicle 5 is approaching the preceding vehicle 30, the autonomous brake system 4 will initiate braking later in case the estimated level of overtaking intention is above a predetermined threshold level than in case the estimated level of overtaking intention is below the predetermined threshold level. Thereby, an improved autonomous brake system 4 is provided since the system 4 will not distract the host vehicle driver 3 in as many driving situations as it otherwise would.

Also, due to the system 4 being configured to delay initiation of braking in case the estimated level of overtaking intention is above a predetermined threshold level, such a system 4 can be designed such that initiation of braking is advanced in case a level of overtaking intention of a driver is below a predetermined level. Thereby, overall occupant safety can be improved.

FIG. 1 also illustrates a vehicle 5 comprising a driver intention estimation arrangement 1, a forward collision warning system 2, and an autonomous brake system 4.

Figure 2:
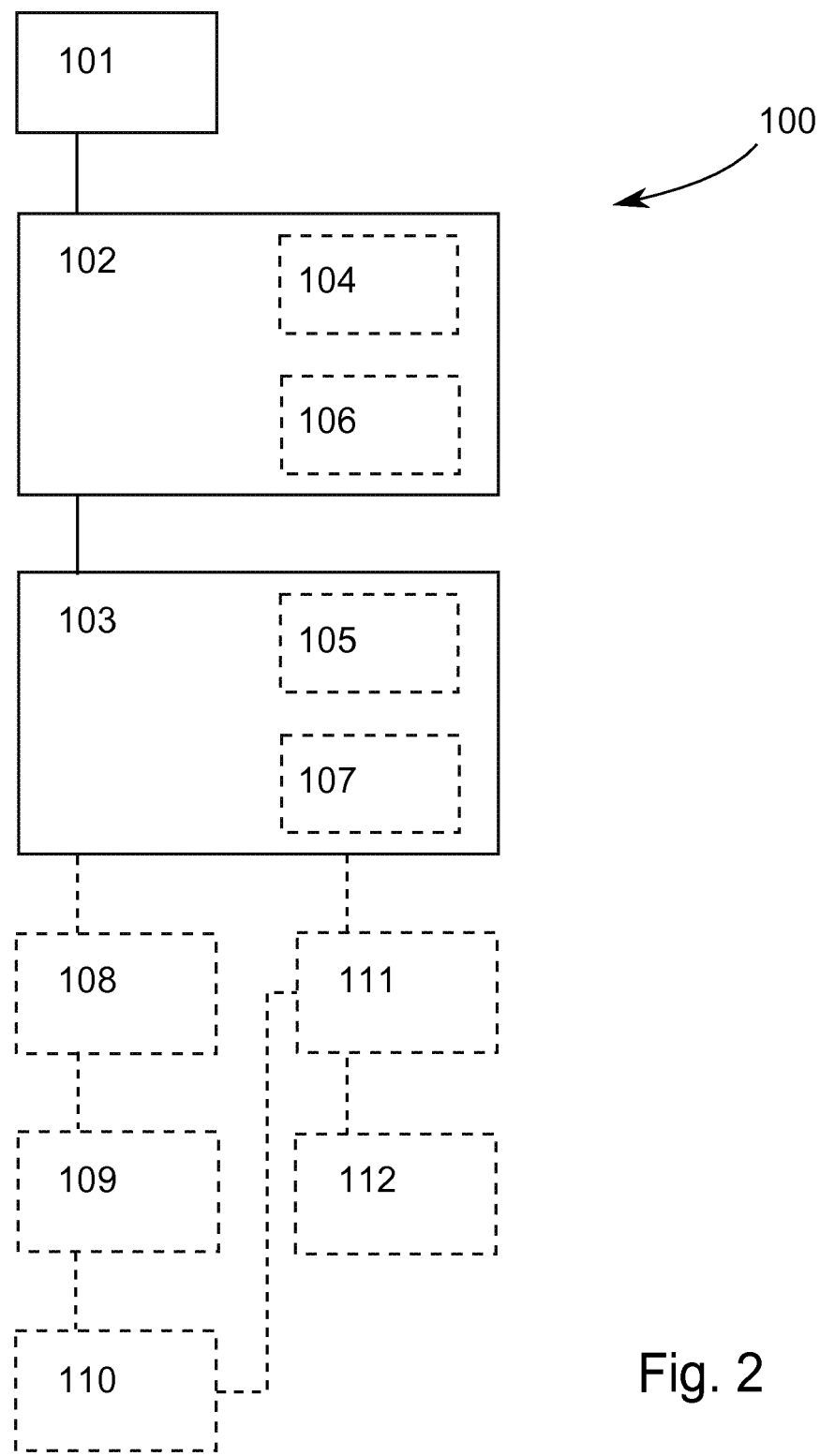
FIG. 2 illustrates a method 100 of estimating a level of overtaking intention of a host vehicle driver.

FIG. 2 illustrates a method 100 of estimating a level of overtaking intention of a host vehicle driver, using an arrangement comprising a driver eye monitoring unit and a processing unit. The method 100 comprises;

monitoring 101 a gaze direction of the at least one eye of the driver of the host vehicle using the driver eye monitoring unit, analyzing 102 the gaze direction, and estimating 103 the level of overtaking intention on the basis of the gaze direction, using the processing unit.

As illustrated in FIG. 2 the analyzing 102 of the gaze direction g may involve;

determining 104 whether the gaze direction g of the at least one eye of the driver is towards a rear view mirror, using the processing unit, and where the method 100 further comprises;

estimating 105 the level of overtaking intention on the basis of this determination, using the processing unit.

Also, as illustrated in FIG. 2, the analyzing 102 of the gaze direction g may involve;

determining 106 a time period during which the gaze direction of the at least one eye of the driver is towards a rear view mirror, using the processing unit, and where the method 100 further comprises;

estimating 107 the level of overtaking intention on the basis of this time period, using the processing unit.

According to some embodiments, the arrangement further comprises a pedal sensor, configured to sense positions of an accelerator pedal of the host vehicle, where the method 100 further comprises;

sensing positions of the accelerator pedal of the host vehicle, using the pedal sensor, analyzing 109 a pattern of accelerator pedal activity, and estimating 110 the level of overtaking intention on the basis of the pattern of accelerator pedal activity, using the processing unit.

According to some embodiments, the arrangement further comprises a distance sensor, configured to measure a distance to a preceding vehicle, where the method 100 further comprises;

measuring 111 a distance to a preceding vehicle, using the distance sensor, and estimating 112 the level of overtaking intention on the basis of at least one of the measured distance to a preceding vehicle and a rate of change of the measured distance to a preceding vehicle.

Although various aspects have been described with reference to example embodiments, many different alterations, modifications and the like will become apparent for those skilled in the art. While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A driver intention estimation arrangement configured to estimate a level of overtaking intention of a driver of a vehicle hosting the arrangement, the arrangement comprising:
    a driver eye monitoring unit configured to monitor a gaze direction of at least one eye of the driver; and
    a processing unit configured to analyze the gaze direction, wherein the processing unit is further configured to estimate the level of overtaking intention on the basis of the gaze direction;
    wherein the analysis of the gaze direction involves a determination of whether the gaze direction of the at least one eye of the driver is towards a rear view mirror in more than one occasion during a predetermined time period, and wherein the processing unit is further configured to estimate the level of overtaking intention on the basis of the determination.

2. The arrangement of claim 1 wherein the analysis of the gaze direction involves a determination of a time period during which the gaze direction of the at least one eye of the driver is in a direction towards a rear view mirror, and wherein the processing unit is further configured to estimate the level of overtaking intention on the basis of this time period.

3. The arrangement of claim 1 further comprising a pedal sensor configured to sense positions of an accelerator pedal of the host vehicle, wherein the processing unit is configured to analyze a pattern of accelerator pedal activity, and wherein the processing unit is further configured estimate the level of overtaking intention on the basis of the pattern of accelerator pedal activity.

4. The arrangement of claim 1 further comprising a distance sensor configured to measure a distance to a preceding vehicle, and wherein the processing unit is further configured to estimate the level of overtaking intention on the basis of at least one of the measured distance to a preceding vehicle and a rate of change of the measured distance to a preceding vehicle.

5. The arrangement of claim 1 further comprising a lane position sensor configured to measure a lateral position of the host vehicle in a current vehicle lane, and wherein the processing unit is further configured to estimate the level of overtaking intention on the basis of at least one of the measured lateral position of the host vehicle in the current vehicle lane and a rate of change of the measured lateral position of the host vehicle in the current vehicle lane.

6. A forward collision warning system comprising the arrangement of claim 1, wherein the system is configured to delay issuance of a warning in case the estimated level of overtaking intention is above a predetermined threshold level.

7. An autonomous brake system comprising the arrangement of claim 1, wherein the system is configured to delay initiation of braking in case the estimated level of overtaking intention is above a predetermined threshold level.

8. A vehicle comprising the arrangement of claim 1.

9. A method of estimating a level of overtaking intention of a host vehicle driver, the method comprising:
    monitoring a gaze direction of at least one eye of the driver of the host vehicle using a driver eye monitoring unit;
    analyzing the gaze direction using a processing unit, wherein analyzing th gaze direction comprises determining whether the gaze direction of the at least one eye of the driver is towards a rear view mirror in more than one occasion during a predetermined time period; and
    estimating the level of overtaking intention on the basis of the gaze direction and the gaze direction determination using the processing unit.

10. The method of claim 9 wherein analyzing the gaze direction comprises determining a time period during which the gaze direction of the at least one eye of the driver is towards a rear view mirror, using the processing unit, and wherein the method further comprises estimating the level of overtaking intention on the basis of this time period, using the processing unit.

11. The method of claim 9 wherein the arrangement further comprises a pedal sensor configured to sense positions of an accelerator pedal of the host vehicle, the method further comprising:
    sensing positions of the accelerator pedal of the host vehicle, using the pedal sensor;
    analyzing a pattern of accelerator pedal activity; and
    estimating the level of overtaking intention on the basis of the pattern of accelerator pedal activity, using the processing unit.

12. The method of claim 9 wherein the arrangement further comprises a distance sensor configured to measure a distance to a preceding vehicle, the method further comprising:
    measuring a distance to a preceding vehicle, using the distance sensor; and
    estimating the level of overtaking intention on the basis of at least one of the measured distance (d) to a preceding vehicle and a rate of change of the measured distance to a preceding vehicle.

* * * * *